United States Patent [19]

Roper et al.

[11] 4,107,238

[45] Aug. 15, 1978

[54] GRAFT COPOLYMERIZATION PROCESS

[75] Inventors: Robert Roper, Summit; Arthur W. Langer, Jr., Watchung, both of N.J.

[73] Assignee: Exxon Research & Engineering Co., Linden, N.J.

[21] Appl. No.: 651,573

[22] Filed: Jan. 22, 1976

[51] Int. Cl.² .............................................. C08F 279/02
[52] U.S. Cl. ................................. 260/880 R; 260/879
[58] Field of Search ............................ 260/879, 880 R

[56] References Cited

U.S. PATENT DOCUMENTS

| | | | |
|---|---|---|---|
| 3,042,634 | 7/1962 | Mankowich | 260/880 R |
| 3,068,191 | 12/1962 | Seijo | 260/880 R |
| 3,076,779 | 2/1963 | Serniuk | 260/879 |
| 3,085,074 | 4/1963 | Burke | 260/879 |
| 3,144,426 | 8/1964 | Burke | 260/879 |
| 3,284,542 | 11/1966 | Carrock | 260/880 R |
| 3,451,988 | 6/1969 | Langer | 526/179 |
| 3,751,524 | 8/1973 | Haigh | 260/880 R |
| 3,954,911 | 5/1976 | Johnson | 260/880 R |

*Primary Examiner*—Paul R. Michl
*Attorney, Agent, or Firm*—J. J. Mahon

[57] ABSTRACT

Novel graft copolymers of isobutylene-conjugated diene copolymeric backbones are prepared employing polymer lithiation wherein the polymeric lithiated complex is treated with an ether compound prior to a graft copolymerization reaction with styrene monomer whereby improved grafting efficiencies are obtained.

19 Claims, No Drawings

GRAFT COPOLYMERIZATION PROCESS

BACKGROUND OF THE INVENTION

This invention relates to novel graft copolymers prepared by reacting isobutylene-conjugated diene copolymers with anionically polymerizable monomers, such as styrene. More particularly, the invention relates to an improvement in the use of polymer lithiation to prepare the novel graft copolymers.

The use of alkyl lithium polymer complexes in graft polymerization reactions is known and disclosed, for example, in U.S. Pat. Nos. 3,451,988 and 3,458,568 and in pending application Ser. No. 562,826 filed Mar. 28, 1975 by A. W. Langer. A problem encountered in such processes has been the achievement of high grafting efficiency when elastomeric isobutylene copolymers are used as the grafting site, that is, providing a product where a substantial portion of the reacted monomer is converted to graft copolymer as opposed to homopolymerized monomer.

In accordance with the present invention, there has been discovered an improved process for grafting styrene monomer in high grafting efficiencies onto an isobutylene-conjugated diene copolymer elastomer which comprises the steps of: (a) forming a solution, or cement, of the elastomer polymer in an inert hydrocarbon solvent; (b) treating said solution with an organo lithium-polyamine composition whereby a lithiated polymer complex is formed; (c) treating said complex with from about 2 to 50 volume % of an organic ether compound at a temperature of at least about 20° C. until any unreacted organo lithium-polyamine is decomposed; and (d) contacting styrene monomer with the product of step (c) whereby a novel graft copolymer of said elastomer and said monomer is formed wherein at least a major portion of the reacted styrene monomer is present in the copolymer.

The elastomers useful in the present invention may generally be described as those rubber hydrocarbon elastomeric isobutylene-conjugated diene copolymers having a conjugated diene content between about 5 and 50, preferably 5 to 35, mole percent. Illustrative of such elastomers are copolymers of isobutylene and conjugated multiolefins having about 4 to 14, preferably 5 to 9, carbon atoms such as iosprene, piperylene, butadiene, 2,3-dimethylbutadiene, cyclopentadiene, methylcyclopentadiene, cyclohexadiene and the like. These copolymers generally will have a viscosity average molecular weight of about 50,000 to 800,000.

Solvents for the elastomers generally comprise the saturated aliphatic or cycloaliphatic inert hydrocarbon solvents such as pentane, hexane, heptane, isooctane, cyclopentane, cyclohexane, decane hexadecane and the like, with cyclohexane being a particularly preferred solvent.

The use of organo lithium and tertiary chelating polyamine catalysts is, per se, known in the art and described in detail, for example, in pending application Ser. No. 562,826 of A. W. Langer, Jr., filed Mar. 28, 1975. Generally, the organo lithium compound contains 1 to 15 carbon atoms, preferably 1 to 8 carbon atoms and the tertiary chelating polyamine is monomeric or polymeric in nature, the monomeric units containing about 3 to 50 carbon atoms.

In general, alkyl lithiums are preferred but cycloalkyl, aryl, or arylalkyl lithium compounds are also suitable. Examples of organo lithium compounds for use in this invention are methyllithium, n-butyllithium, cyclooctyllithium, dodecylithium, 2-methyl-butyllithium, phenyllithium, benzyllithium, sec-butyllithium, allyllithium, vinyllithium, and the like with n-butyllithium and sec-butyllithium being preferred. In conjunction with the organolithium compound is employed an amine containing at least 2 nitrogen atoms which is capable of chelating with the organolithium component of the catalyst. Monomeric diamines and triamines are preferred, however, the polyamine may contain 4 or more nitrogen atoms and may be polymeric rather than monomeric in nature. Examples of preferred polyamines include N,N-dimethyl-N', N'-diethyl-1,2-ethanediamine; N,N,N',N'-tetramethyl-1,2-ethanediamine; N,N,N',N'-tetraethyl-1,2-ethanediamine; N,N,N',N'-tetramethyl-1,3-propanediamine; N,N,N',N'-tetramethyl-1,2-propanediamine; N,N,N',N'-tetramethyl-1,4-butanediamine; N,N,N',N'-tetramethyl-1,2-cyclohexanediamine, 1,2-dipyrolidylethane, sparteine and the like. Particularly preferred for use in the present invention are N,N,N',N'-tetramethyl-1,2-ethanediamine hereinafter referred to as TMEDA and trans-N,N,N',N'-tetramethyl-1,2-cyclohexanediamine.

The ethers employed in the process of the present invention include organic aliphatic, aromatic or heterocyclic monoethers and polyfunctional ethers, such as diethers, triethers and tetraethers. Generally, the ethers are compounds which are normally liquid at the temperature of the ether treatment step. Preferably, the ether employed will have a boiling point of from about 30° to 100° C. to facilitate recycling, processing, solvent removal and similar procedures. Examples of such ethers are dimethyl ether, diethyl ether and higher dialkyl ethers, the alkyl groups having up to about 8 carbon atoms as further exemplified by di-n-butyl ether, diisobutyl ether, di-n-heptyl or di-octyl ether and the like. These ethers may also be mixed saturated ethers such as methyl-t-butyl ether, ethyl-n-amyl ether and the like. Acetals and ketals such as dimethoxymethane, 2-methoxytetrahydrofuran, 1,3-dioxolane and 2,2-dimethoxypropane are also suitable. Heterocyclic ethers such as tetrahydrofuran, which is particularly preferred in the present invention, and 2-methyltetrahydrofuran and 3-methyltetrahydrofuran, and di-, tri- and tetraethers such as dioxane, diethylene glycol diethyl ether, diethylene glycol dimethyl ether, diethylene glycol dibutyl ether are also suitable. Aromatic ethers are exemplified by benzyl ether, benzylmethyl ether, phenylmethyl ether and the like.

In the present invention, outstanding results have been achieved utilizing styrene. It is believed that other anionically polymerizable monomers may find utility in the present invention and these monomers are exemplified by $C_4$–$C_{12}$ conjugated diolefins such as butadiene, 1,3-isoprene, 2-alkyl-1,3-butadiene, 2-phenylbutadiene-1,3 and the like, aromatic vinylic hydrocarbons, such as alphamethylstyrene, p-methylstyrene, p-chlorostyrene, p-(t-butyl)styrene, vinyltoluene as well as mixtures of such monomers. Also of possible utility are alkylene oxides such as propylene oxide, butadiene monoxide as well as alkyl acrylates and methacrylates such as methylmethacrylate, ethylacrylate, butylacrylate and the like. Other potentially suitable monomers are acrylonitrile, dialkyl acrylamides, vinyl heterocyclics, and similar anionically polymerizable monomers.

In the process of the present invention the ether treatment step has been found to be highly effective in promoting the grafting efficiency when the isobutylene copolymer elastomers as described herein are employed as the base polymer. Grafting efficiencies on the order of at least 50% and usually in the range of 70 to 80% are readily achieved in accordance with the present invention. The term "grafting efficiency" as used herein refers to the portion of reacted styrene monomer which is converted to copolymer, that is, the weight percent monomer converted to graft copolymer relative to total monomer conversion. It has been found that in the absence of the ether treatment step a substantial quantity of monomer will be converted to homopolymer without the desired graft copolymer being formed. It is believed that the ether functions by decomposing any unreacted organolithium polyamine complex present prior to addition of the monomer. If the catalyst complex is left unreacted it will adversely affect the grafting reaction by promoting conversion of the monomer to homopolymer.

The ether treatment is carried out so that there is employed about 2 to 50 volume % based on the total volume of reaction mixture, presently about 5 to 30 volume % of ether. Moreover, it has been found that the temperature during the ether treatment step should be at least about 20° C., otherwise poor grafting efficiencies are likely to result. A temperature range of about 20° to 50° C., particularly 40°-50° C., is generally suitable for the ether treatment step, particularly when the preferred ether, tetrahydrofuran, is employed. At the preferred temperature range, the ether treatment step is carried out over a period of about 30 minutes to 4 hours.

The grafting reaction is carried out using conventional techniques once the ether treatment step has been completed. The grafting reaction may be carried out conveniently at room temperature and pressure. Generally, temperatures in the range of $-100°$ to 150° C., preferably 0° to 100° C., are used with pressure ranging from atmospheric pressure to 5000 psig or higher as may be required when the monomer is gaseous.

The styrene monomer is allowed to remain in contact with the polymer complex for about 0.1 to 10 hours, preferably 0.5 to 4 hours. The quantity of styrene added is quite variable depending on the desired properties of the graft product desired. Generally, the range of styrene added is from about 10 to 400 parts per hundred parts of isobutylene copolymer backbone. The reaction is terminated by adding small amounts of water or an alcohol, such as methanol, isopropanol, n-butanol and the like. The polymer is then recovered by adding excess alcohols, such as those mentioned, or ketones such as acetone or methyl ethyl ketone. The precipitated graft copolymer product is then filtered and washed with more alcohol or other suitable solvents, and dried.

The styrene grafted products of the present invention are considered to be novel thermoelastomer products and, as such, they constitute a further embodiment of the present invention. As thermoelastomers these novel products have the elastic and resilient properties of rubbers thereby being adaptable to thermoplastic processing techniques such as injection molding, extrusion blow molding or vacuum forming for these novel copolymers. The styrene content of the graft copolymer product may vary from about 10 to 80 weight percent. The preferred ranges are a function of the properties desired. For a thermoelastic product having predominantly rubbery properties such as high elongation and low compression set or tensile set, the preferred range is 20 to 40 weight percent. For thermoelastics with predominantly plastic-like properties, that is, relatively higher tensile strength and flexural modulus but less resiliency and high compression set, the preferred range of styrene content in the finished product is 40 to 70 weight percent styrene.

Preferred products include styrene modified isobutylene-diene copolymers wherein the diene content of the isobutylene-diene polymer backbone is 5 to 35 mole percent. Preferred dienes are isoprene, butadiene, cyclopentadiene, methyl-cyclopentadiene, 2-3-dimethylbutadiene and piperylene.

The invention is further illustrated by the following examples which are not to be considered as limitative of its scope.

EXAMPLE 1

A copolmer of isobutylene and cyclopentadiene (CPD) containing 23 mole % CPD and having a $\overline{M}_n$ of 50,000, a $\overline{M}_w$ of 183,000 and a Mooney value at 126.7° C. (260° F.) (large rotor, 1+8 minutes) of 13, was dissolved in cyclohexane to give a polymer concentration of 90.3 g/l. 212 ml of this solution, containing 19.1 g polymer, was treated with 4 ml of a 2.2 M n-butyl lithium solution in hexane. All operations were carried out with carefully dried materials under a nitrogen atmosphere in the absence of atmospheric moisture or oxygen. 30 ml of this solution was removed as samples for carbon-bound lithium titration, which indicated that the solution had a n-butyl lithium concentration of 0.0214 M or 3.9 mmol n-butyl lithium present in the remaining reaction mixture. The reaction mixture was heated to 70° C., 3.9 mmol of TMEDA was added to form the 1:1 complex n-butyl lithium, and the mixture was heated for 2 hours at 70° C. to effect lithiation of the polymer. Another 10 ml sample was removed for titration, the mixture was cooled to 30° C., and 30 ml of THF was added, giving a THF concentration of 15 percent by volume. Another 20 ml portion was removed, leaving a volume of 186 ml, containing 15.6 g polymer. 88 minutes after THF addition, 9.00 ml (8.10 g) of styrene were added, and allowed to react for 1 hour at 30°-39° C., and another 16 hours at 25° C. The reaction was then quenched with 0.5 ml isopropyl alcohol. A determination of total polymer content of the reaction mixture indicated that all the styrene had polymerized.

The product was recovered by precipitation in excess methanol. The polymer was dried in a stream of nitrogen, and then shaken with 400 ml hexane to dissolve. A small portion of hexane-insoluble material was separated by centrifugation (fraction A). The hexane solution was treated with 400 ml acetone, which resulted in a second precipitated fraction (fraction B), which was separated by decanting the supernatant solution, and washed with acetone. The supernatant solution was evaporated down to 50 ml, whereupon another precipitate came down (fraction C), and this again was separated by decantation and washed with acetone. The final supernatant solution was evaporated to dryness to yield fraction D. All fractions were dried under vacuum and analyzed for total styrene content by NMR and homopolystyrene content by GPC.

The analytical results are summarized below in Table 1.

TABLE 1

Analysis for Example 1

| Fraction | Wt. % Fraction on Total Sample | % homo PS* in Fraction | % homo PS* On Total Sample | % total PS (graft + homo) in Fraction | % total PS (graft + homo) On Total Sample |
|---|---|---|---|---|---|
| A | 1.2 | 34 | 0.4 | 39 | 0.5 |
| B | 78.1 | 0 | 0.0 | 26 | 20.3 |
| C | 14.5 | 5 | 0.7 | 53 | 7.7 |
| D | 6.2 | 100 | 6.2 | — | 6.2 |
|   |     |     | 7.3 |   | 34.7 |

*polystyrene

The grafting efficiency calculated from these data is 79%.

Fractions B and C, which constitute 92.6% of the total product, were combined by dissolving both in cyclohexane and then stripping off the solvent under vacuum. A stabilizer, Irganox 1010, was added to the solution before stripping at a level of 0.5% on polymer.

This polymer blend contains less than 1% homopolystyrene, the major portion (99+%) being a graft copolymer containing 29% grafted polystyrene.

To test its properties as thermoelastomer, a 0.16 cm pad was compression molded at 125° C., and tensile measurements run at 2 inches/min on dumbbells cut from the pad. The tensile strength was 8.5 MPa (1230 psi), the elongation 330%, the modulus at 100% elongation was 3.5 MPa (490 psi) and tensile set after 30 minutes was 14%. The viscosity of the polymer, as measured on an Instron capillary rheometer using a 1.27 × 25.4 mm (0.05 × 1.0 inch) capillary, was as follows:

| Shear Rate, sec$^{-1}$ | Viscosity,* Pa.s |
|---|---|
| 10 | 15,000 |
| 100 | 2,500 |
| 1000 | 420 |

*Pascal seconds × 10 = poises

EXAMPLE 2

A copolymer of isobutylene and isoprene containing 6 mole % isoprene and having a $\overline{M}_n$ of 83,000 and a Mooney value at 126.7° C. (260° F.) (large rotor, 1+8 minutes) of 10, was dissolved in cyclohexane to give polymer concentration of 155.5 g/l. This solution was diluted with 88 ml cyclohexane, then treated with 4 ml of a 2.2 M n-butyl lithium solution in hexane. The procedure used was similar to that in Example 1. Titration of the reaction mixture indicated the presence of 3.6 mmol n-butyl lithium, so 3.6 mmol TMEDA were added to form the 1:1 complex. Lithiation was carried out at 70° C. for 2 hours, after which the mixture was cooled to 45° C., 30 ml THF was added to give a THF concentration of 15% by volume, and the mixture reacted for 185 minutes at 45° C. After removal of a 20 ml sample, the mixture had a polymer content of 14.0 g. Styrene (10.8 g) was added 185 minutes after THF addition, and grafting was then carried out similar to Example 1.

The reaction product was reprecipitated from acetone. The acetone insoluble fraction constituted 89% of the total polymeric product, and was found to contain 28% of polystyrene (NMR), none of which was homopolystyrene (GPC), indicating that this fraction was all graft copolymer. The acetone soluble fraction (11% of the total product) contained 94% polystyrene homopolymer. The grafting efficiency was calculated as 70.5%.

The acetone insoluble fraction was compression molded and tested for tensile properties in a manner similar to Example 1. Tensile strength was 7.9 MPa (1145 psi), elongation was 220%, modulus at 100% elongation was 4.6 MPa (660 psi) and tensile set was 19%. Before grafting, the isobutylene-isoprene copolymer had zero tensile strength and more than 1000% elongation.

EXAMPLE 3

A copolymer of isobutylene and CPD containing 13 mole percent CPD and having a $\overline{M}_n$ of 51,000 and a $\overline{M}_w$ of 173,000 was dissolved in cyclohexane to give a concentration of 97.4 g/l. 210 ml of this solution was treated with 4.0 ml of a 2.2 M n-butyl lithium solution, and after removal of 10 ml for analytical samples, the mixture was heated to 70° C. and 0.36 ml TMEDA was added. Active lithium concentration before TMEDA addition, by titration, was 0.0156 M. The mole ratio of n-butyl lithium to TMEDA was 100:87. The mixture was heated for 2 hours at 70° C. to effect lithiation.

The temperature was lowered to 45° C., and 30 ml THF was added and allowed to react for 2 hours at 45° C. Periodically, 20 ml samples of reaction mixture were withdrawn and injected into a serum stoppered flask containing 2 ml styrene, and stirred for 1 hour. This reaction with styrene was carried out under dry conditions in a nitrogen atmosphere, as was the lithiation reaction. Each of the sample flasks were then quenched with alcohol, the product precipitated in methanol, and then redissolved in cyclohexane and reprecipitated with acetone to remove homopolymer. Both acetone soluble and insoluble fractions were analyzed for styrene content by NMR, and the grafting efficiency calculated. All acetone-soluble fractions contained 94–96% styrene, indicating essentially all homopolymer.

The results obtained are set forth in Table 2 below.

Table 2

Analysis for Example 3

| Time of Sampling | % Grafting Efficiency | % Styrene in Graft Copolymer | % Homopolymer in Total Product |
|---|---|---|---|
| Immediately before THF addition | 18 | 17 | 43 |
| 0.25 hours after addn. | 33 | 26 | 34 |
| 1.0 hours after addn. | 62 | 39 | 19 |
| 2.0 hours after addn. | 60 | 33 | 18 |

It is clear from these data that before the THF treatment, poor grafting efficiencies were obtained. The amount of styrene in the graft copolymer was low, while the amount of homopolymer in the total product was high. After 0.25 hours THF treatment, the grafting efficiency improved, but the best grafting efficiency, 62%, was obtained after 1 hour THF treatment—this gave the highest amount of grafted styrene, and relatively low homopolymer content.

What is claimed is:

1. A method for grafting styrene monomer in high grafting efficiency onto an elastomeric isobutylene-conjugated diene copolymer which comprises the steps of: (a) forming a solution of the elastomer in an inert hydrocarbon solvent; (b) treating said solution with an organolithium chelating polyamine composition whereby a polymer lithium polyamine complex is formed; (c) treating said complex with from 2 to 50 volume % of an organic monoether or polyfunctional ether whereby unreacted organolithium polyamine is decomposed; and (d) contacting the styrene monomer with the treated complex of step (c) whereby a graft copolymer is formed, at least a major proportion of the reacted styrene monomer being present in said graft copolymer, and said copolymer is a thermoelastomer.

2. The method of claim 1 wherein the elastomer has a conjugated diene content between about 5 and 50 mole %.

3. The method of claim 1 wherein the conjugated diene has 5 to 9 carbon atoms.

4. The method of claim 1 wherein the conjugated diene is isoprene, butadiene, methyl cyclopentadiene, cyclopentadiene, 2,3-dimethylbutadiene or piperylene.

5. The method of claim 1 wherein the ether is tetrahydrofuran.

6. The method of claim 1 wherein the ether treatment step is carried out at a temperature between 20° and 50° C.

7. The method of claim 1 wherein the organolithium is n-butyllithium or sec-butyllithium.

8. The method of claim 7 wherein the polyamine is tetramethyl-1,2-ethanediamine.

9. The method of claim 1 wherein the grafting efficiency is at least 70%.

10. A novel thermoelastomeric graft copolymer composition, said copolymer composition consisting essentially of an isobutylene-conjugated diene hydrocarbon copolymer backbone, said diene having 4 to 14 carbon atoms, the diene content being between about 5 and 50 mole percent and grafted copolymerized styrene, the styrene content of said thermoelastomeric graft copolymer being about 20 to 40 weight percent, said graft copolymer composition being prepared according to the process of claim 1.

11. A novel thermoelastomeric graft copolymer composition, said copolymer composition consisting essentially of an isobutylene-conjugated diene hydrocarbon copolymer backbone, said diene having 4 to 14 carbon atoms, the diene content being between about 5 to 50 mole percent and grafted copolymerized styrene, the styrene content of said thermoelastomeric graft copolymer being about 40 to 70 weight percent, said graft copolymer composition being prepared according to the process of claim 1.

12. The composition of claim 10 wherein the diene has 5 to 9 carbon atoms.

13. The composition of claim 11 wherein the diene has 5 to 9 carbon atoms.

14. The composition of claim 10 wherein the diene is isoprene, butadiene, cyclopentadiene, methyl cyclopentadiene, 2,3-dimethylbutadiene or piperylene.

15. The composition of claim 11 wherein the diene is isoprene, butadiene, cyclopentadiene, methyl cyclopentadiene, 2,3-dimethylbutadiene or piperylene.

16. The composition of claim 10 wherein the diene is cyclopentadiene.

17. The composition of claim 10 wherein the diene is isoprene.

18. The composition of claim 10 wherein the diene content is 8 to 35 mole percent.

19. The composition of claim 11 wherein the diene content is 8 to 35 mole percent.

* * * * *